J. T. HUGHES.
COMBINED PLOW AND CORN-PLANTER.

No. 194,091. Patented Aug. 14, 1877.

Witnesses:

Inventor:
John T. Hughes
By his attys.
Dodge & Son

UNITED STATES PATENT OFFICE.

JOHN T. HUGHES, OF MURRAYVILLE, ILLINOIS.

IMPROVEMENT IN COMBINED PLOW AND CORN-PLANTER.

Specification forming part of Letters Patent No. 194,091, dated August 14, 1877; application filed July 17, 1876.

*To all whom it may concern:*

Be it known that I, JOHN T. HUGHES, of Murrayville, in the county of Morgan and State of Illinois, have invented certain new and useful Improvements in Corn-Planting Machines, of which the following is a specification:

My invention relates to a wheeled machine for planting and cultivating corn; and consists in certain peculiarities of construction and combination of devices hereinafter described.

Figure 1:
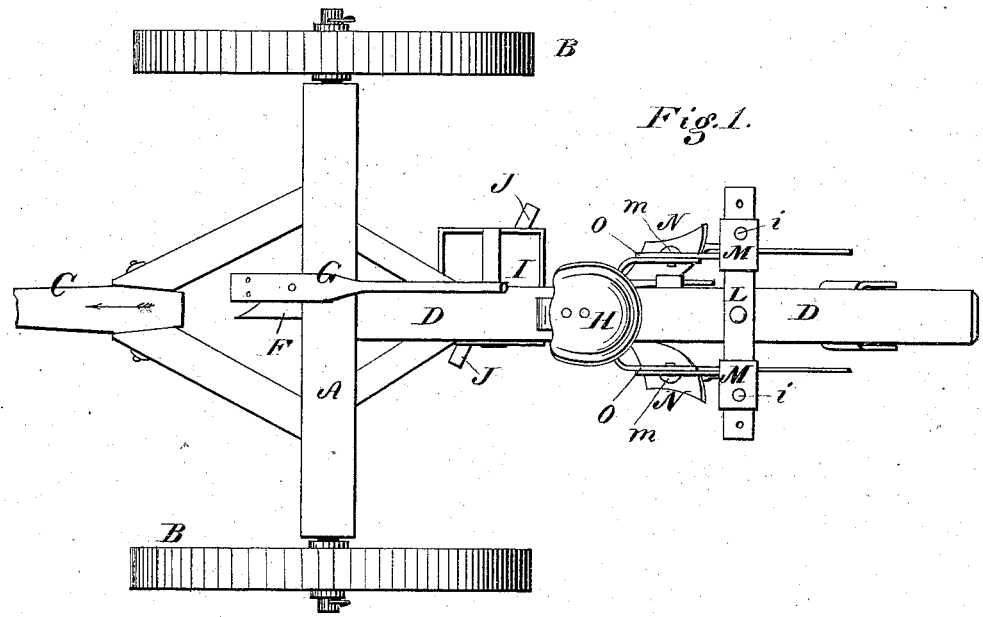
Figure 2:
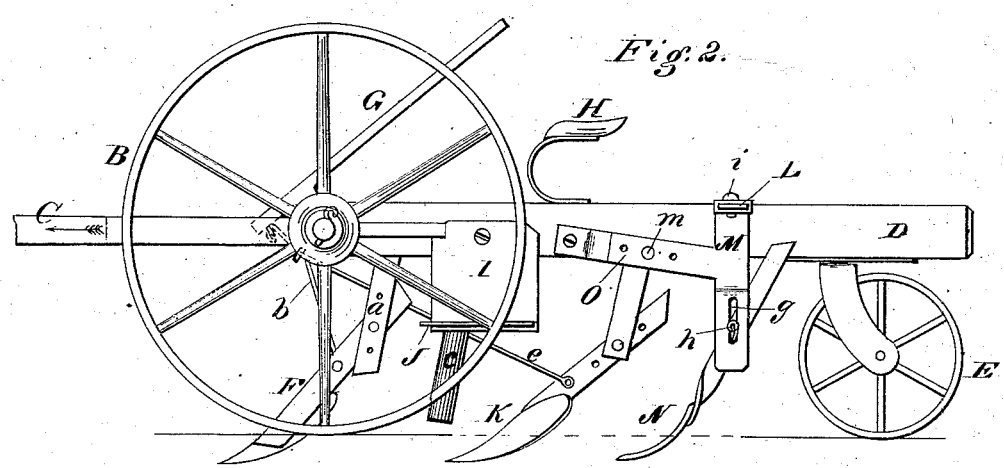
Figure 3:
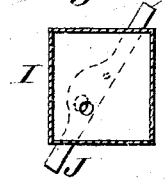

Figure 1 represents a top-plan view of my machine; Fig. 2, a side elevation of the same; Fig. 3, a plan view, illustrating the feeding or dropping device.

A represents a heavy axle, having its ends mounted in two supporting-wheels, B, and having secured to its middle a draft pole or tongue, C, and a rigid rearwardly-extending beam, D, the latter being sustained at its rear end by a large caster-wheel, E, as shown. The axle A and beam D, with their supporting-wheels B and E, constitute the body or main frame of the machine. F represents a plow or shovel pivoted between depending arms $a$ on the under side of the beam D, and connected by a link, $b$, to the end of a hand-lever, G, which latter is pivoted on the middle of the axle in such position as to be readily reached by the operator, so that he may, by depressing the lever, raise the shovel F out of the ground. H represents a seat, in which the operator rides, located on top of the beam D a short distance behind the axle, as shown. I represents a seed box or hopper attached to the under side of the beam D, in rear of the shovel F, and provided with a discharge-tube, $c$, which deposits the seed in the furrow opened by said shovel. J represents a vibrating feed-slide, pivoted at its middle horizontally across the under side of the feed-hopper, with its ends extending beyond the same, so that the driver can place his feet thereon and give it the proper movement. The hopper-bottom is provided with an opening, through which the seed passes to the discharge-tube, and the slide J provided with a corresponding hole, so that as it is vibrated its hole, alternately registering and passing out of line with the hole in the hopper, causes the proper feeding of the seed.

This arrangement of the slide on a pivot, with the protruding ends to be operated by the feet of the attendant, produces an exceedingly cheap, simple, and reliable machine, and gives the operator the free use of both hands.

K represents a second shovel or plow, pivoted in arms depending from the beam D behind the seed-hopper, for the purpose of covering the corn after its deposit in the furrow opened by the first shovel. This second shovel is also connected by a link, $e$, with the hand-lever G, so that the operation of the lever throws both shovels out of action at the same time. L represents a transverse bar secured across and extending out on each side of the beam D, and carrying on each end a depending laterally-movable arm, M, each of which latter has its lower end split vertically to receive the shank or standard of a shovel, N, and also provided with a transverse vertical slot, $g$, to receive the pivot $h$ of said shank, as shown. Each arm M has its upper end provided with a wide head, encircling the bar L, and giving the arm and its shovel a firm support.

The arms M are held from moving laterally by pins $i$ passing through them into the bar L, which latter is provided with a series of the pin-holes, in order that the arms and their shovels N may be adjusted and held at different distances apart, as circumstances may require. The arms M are sustained against the strain of the shovels by braces O extending forward and secured to the beam. These braces are divided transversely into two parts, the ends of which are overlapped and united by bolts $m$, the overlapping ends being provided with a series of bolt-holes in order that they may be varied in length, as the lateral adjustment of the arms may render necessary.

The bar L may be made of a round form, and the arms M arranged to turn thereon, in which case the adjustable braces O will serve to change the inclination of the arms, and thereby the position of the shovels.

The four shovel-standards are pivoted in such manner that, in case of the machine being moved backward, they can yield and swing forward, so as to avoid breakage of the shovels.

If desired, the shovels N may be connected with the hand-lever G in the same manner as the forward shovels, so that in turning the machine, or in going to or from the field, the driver can throw all four shovels out of action by means of the lever without removing from his seat.

The pivots $h$ of the shovels N may be bolts, which can be set up tight to hold the shovels at any required elevation; or they may be otherwise constructed so that they may be adjusted up and down in the slots $g$ and fastened at any required point.

In operating the machine the driver rides on the seat H, with his feet bearing on the ends of the slide J, which he gives a vibratory motion at the proper speed to drop the corn at suitable distances apart. The forward shovel opens the furrow, the tube $c$ deposits the corn therein, and the shovel K turns the earth in upon the corn, and then the wheel E rolls the earth down smoothly and compactly in place. The shovels N, following after on each side, break up the ground between the rows, eradicating the weeds, throwing more or less loose earth inward toward the furrows or rows, and leaving the ground in the condition most conducive to the rapid growth of the corn.

The machine may also be used with the forward shovels thrown out of action as a cultivator and scarifier, to hill up the ground about the growing plants.

Having thus described my invention, what I claim is—

1. The combination of the main frame A D, provided with the wheels B and E, the pivoted shovels F and K, connected with the hand-lever G, the hopper I, provided with the vibrating feed-slide J, as shown, and the seat H, located, as shown, so that the operator sitting thereon may control the lever with his hand and operate the feeding device with his feet.

2. In combination with the driver's seat H of a corn-planter, a seed-hopper, I, provided with a pivoted feed-plate or slide, J, having its two ends adapted and arranged in position to be operated by the feet of the driver, in the manner shown.

In testimony that I claim the foregoing as my own invention I affix my signature in presence of two witnesses.

JOHN T. HUGHES.

Witnesses:
   T. G. TAYLOR,
   LEW H. HATFIELD.